Nov. 18, 1969  A. H. JOSEPH  3,479,522
POSITION CONTROL SYSTEM
Filed March 7, 1968  3 Sheets-Sheet 1
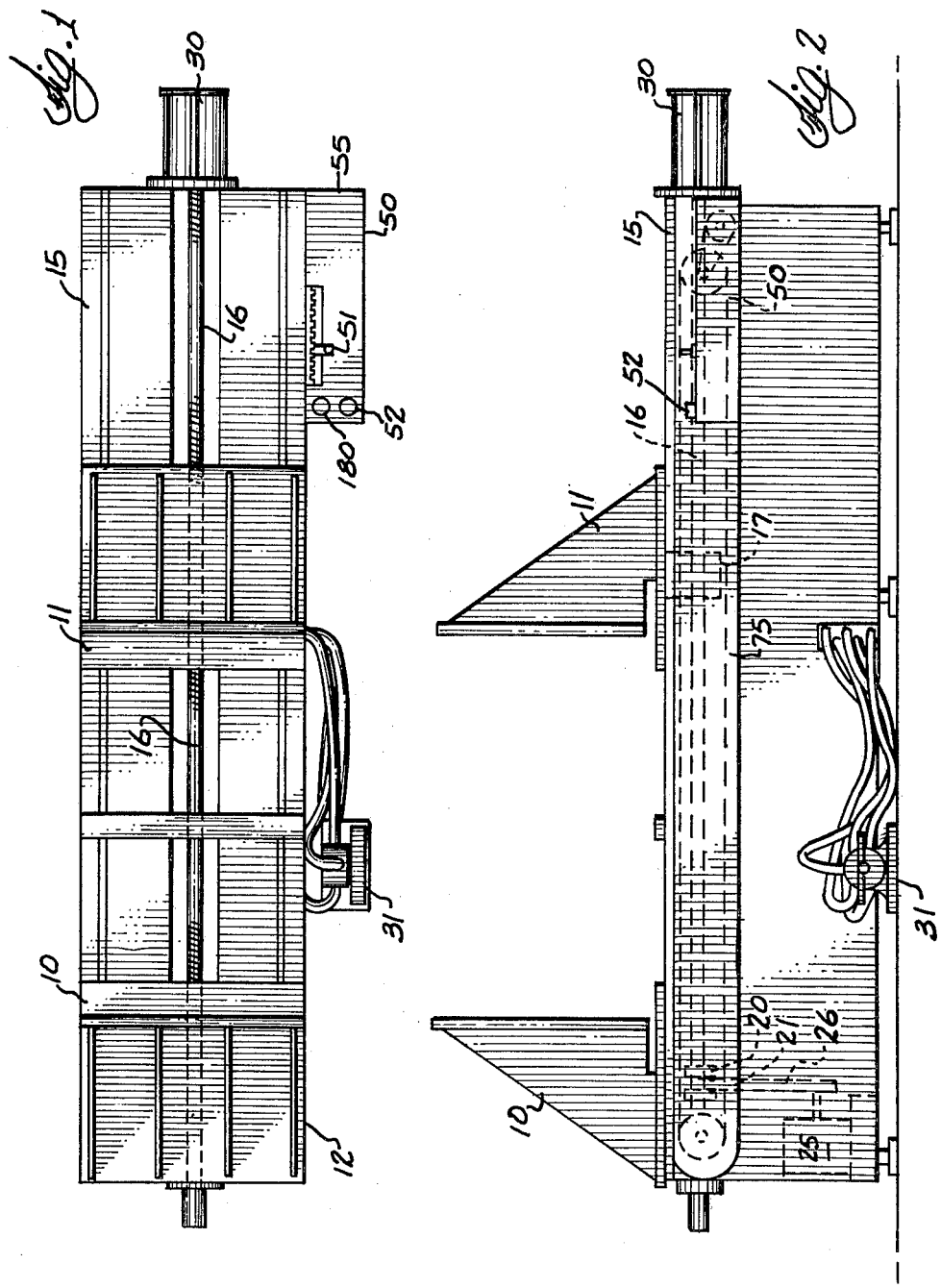
INVENTOR.
Alan H. Joseph
BY Pendleton, Neuman,
Seibold & Williams
Attorneys

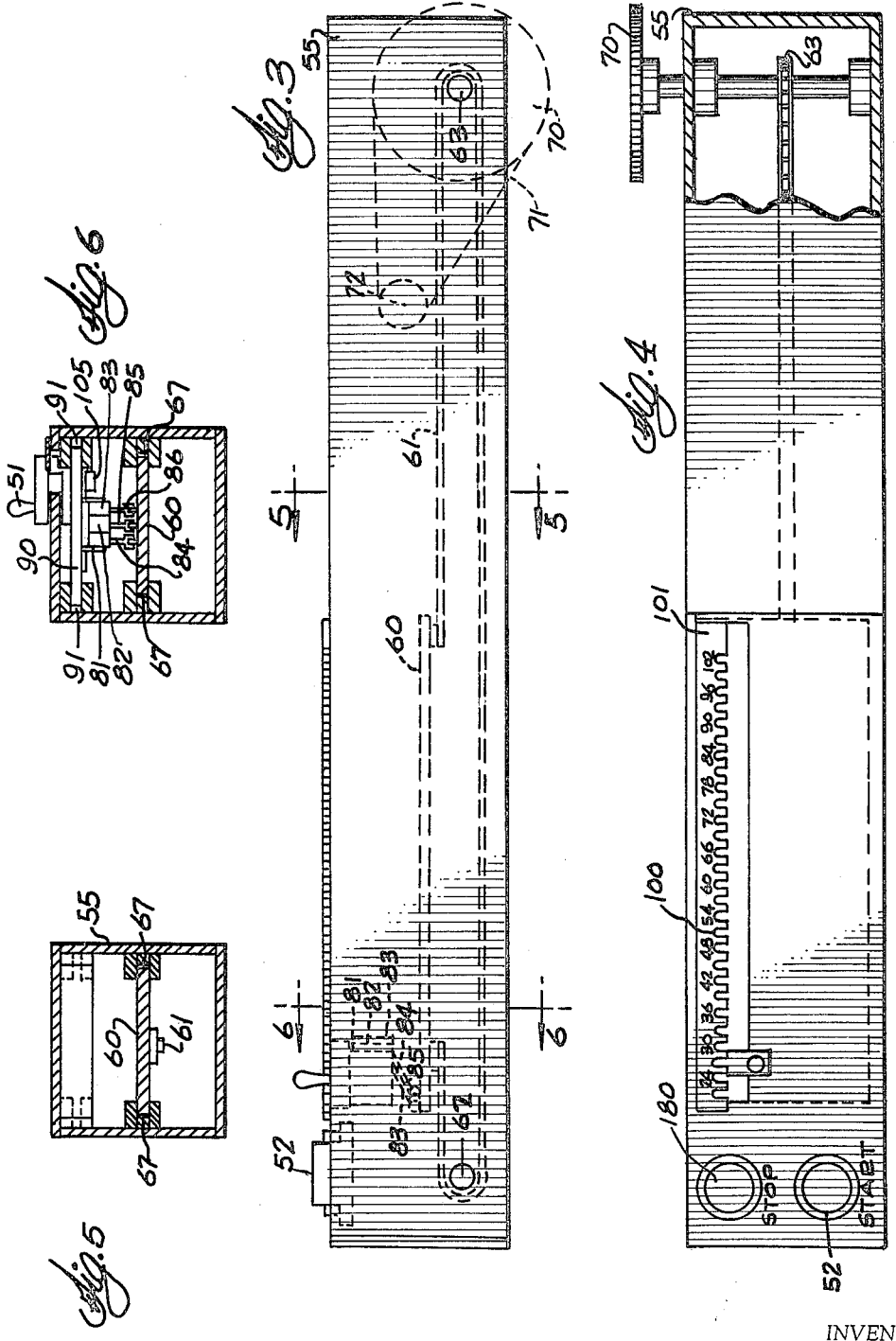

United States Patent Office 3,479,522
Patented Nov. 18, 1969

3,479,522
POSITION CONTROL SYSTEM
Alan H. Joseph, Highland Park, Ill., assignor to Handy Manufacturing Company, Chicago, Ill., a corporation of Illinois
Filed Mar. 7, 1968, Ser. No. 711,306
Int. Cl. H02b 1/24, 35/26
U.S. Cl. 307—119                                    9 Claims

ABSTRACT OF THE DISCLOSURE

A position control system used to control a clamping machine is described in detail. The control system includes a mechanical analogue having a movable element duplicating the motion of the clamp being controlled. The movable element cooperates with a plurality of switches to stop and start an electric motor which drives the clamping element. The movable element in the embodiment described is the edge of a plate which is driven by a chain system to duplicate the motion of the clamp on a reduced scale. The plurality of switches are simple micro-switches which attach directly to well-known starter circuits. A hydraulic cylinder is used together with the motor control system to permit application of the proper pressure against the element being clamped.

FIELD OF THE INVENTION

This invention relates to position control systems and particularly to a position control system used with a clamping device.

SUMMARY OF THE INVENTION

The present invention is a position control system which is useful in any application where the position of an element is controlled. The position control system includes a mechanical analogue of the clamp or other device being controlled. The mechanical analogue duplicates the motion of the controlled element on a reduced scale and actuates a plurality of switches which control the operation of the motor which drives the controlled element. The switches are movable by the operator of the machine to set the desired position of the controlled element. In the preferred embodiment, the switches simply connect to a conventional starting circuit which controls the supply of power from a power source to the motor.

In general, it is desirable to provide a separate mechanical analogue with separate switching systems for each particular direction of motion being controlled. Thus, in a clamping device which includes two movable clamps, two mechanical analogues and corresponding switching systems would be employed. It is also desirable for some applications to provide an indexing mechanism for the movable switching systems.

In many cases, such as in a clamping machine, it is desirable to use the position control system for the initial positioning of the clamping member, or other controlled element, and then use a pressure device, such as a pneumatic or hydraulic cylinder, to set the final position of the controlled element. Thus, where the position control system is used in conjunction with a machine for gluing wooden pieces, the position control system may provide the initial position of the clamp and the hydraulic cylinder, with a relatively limited stroke, can provide the necessary pressure for closing glue joints.

BRIEF DESCRIPTION OF THE DRAWINGS

FIGURES 1 and 2 are a plan view and a side view respectively of a clamping device constructed according to the present invention. FIGS. 3 and 4 are a side view and a plan view respectively of the position control system employed with the clamping device shown in FIGS. 1 and 2. FIG. 5 is a sectional view taken along line A—A in FIG. 3. FIG. 6 is a sectional view taken along line B—B in FIG. 3.

DETAILED DESCRIPTION OF A PREFERRED EMBODIMENT

Figure 7:
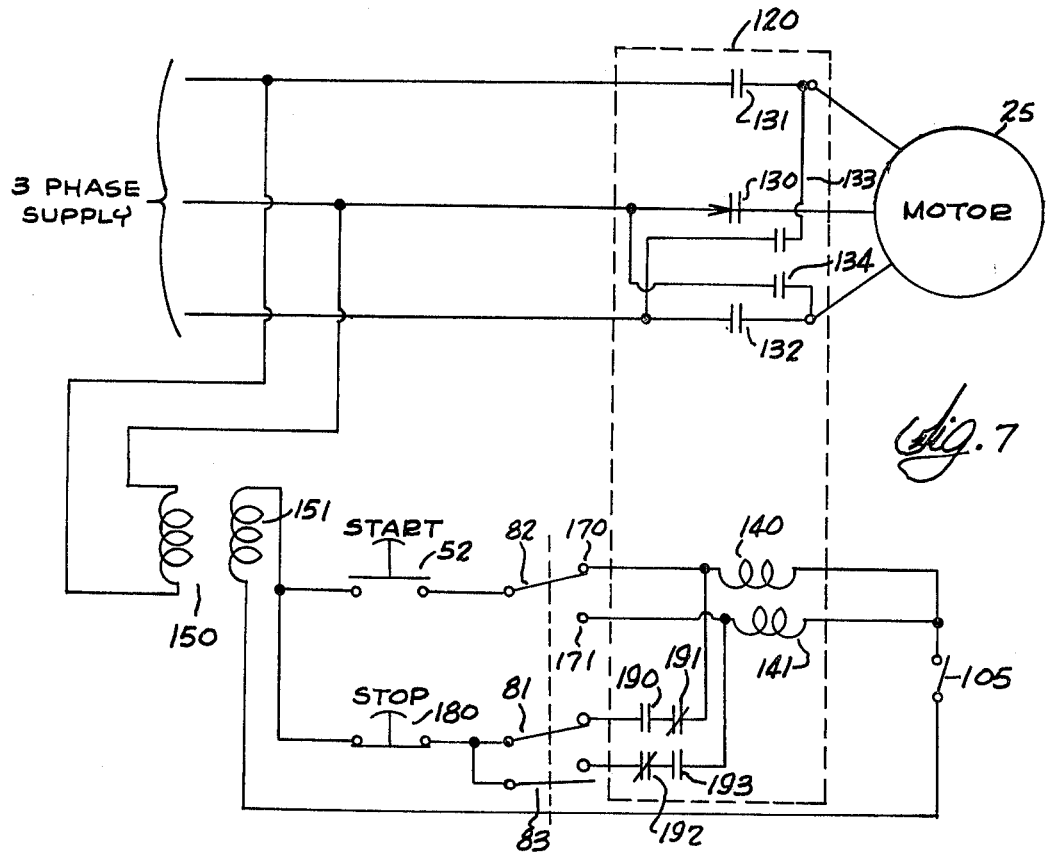
FIG. 7 is a schematic diagram of a motor control circuit constructed according to the present invention.

The clamping machine shown in FIGS. 1 and 2 represents one use of the position control system constructed according to the present invention. In general, the control system may be used in any application where the position of a movable element is to be controlled. The clamping device shown in FIGS. 1 and 2 is advantageously constructed with a position control system constructed according to the present invention.

The clamping machine, which may be used for example in gluing wooden cabinets or other fixtures, includes a first stationary clamp 10 and a movable clamp 11 between which the work piece is held. The clamp 10 is rigidly attached to the base 12 of the clamping machine. The movable clamp 11 rides along guideways 15 and is driven by a rotating lead screw 16 which is drivingly connected to the clamp 11 through a threaded bracket 17. The lead screw 16 is mounted at its left end in a two-piece bushing 20 with a sprocket wheel 21 mounted between the two pieces of the bushing 20. The sprocket wheel 21 is keyed to the lead screw 16 so that the lead screw may move longitudinally within the bushing 20 without moving the drive sprocket 21. The lead screw 20 is rotated by a motor 25 connected to the sprocket wheel 21 by a chain 26. The details of the lead screw and drive are conventional and form no part of the present invention.

The right end of the lead screw 16 it attached to a hydraulic cylinder 30 which can move the lead screw 16 longitudinally for a short predetermined distance. The hydraulic cylinder 30 is controlled by a conventional foot pedal arrangement 31. Like the motor drive mechanism, the hydraulic drive mechanism for the lead screw 16 is completely conventional and will not be described in any detail.

The control unit 50, constructed according to the present invention, is mounted on the right-hand side of the machine and is adapted to control the movement of the clamp element 11 by controlling the operation of the motor 25. The control unit 50 is described in detail below with reference to the remaining figures of the drawing. The operation of the machine, however, will be briefly described here. The control unit 50 has a movable positioning arm 51 which the operator sets to control the position of the clamp 11. For example, if the work piece to be clamped is approximately 24 inches, then the operator would set the movable element 51 at the 24-inch position indicated on the control unit. The operator then presses a start button 52 in the control unit 50 causing the clamp 11 to move to a position slightly greater than 24 inches from the face of the stationary clamp 10. The operator next actuates the foot pedal 31 which causes the clamp 11 to move against a work piece (not shown) positioned between the two clamps 10 and 11, to exert the required amount of pressure.

The control unit 50 for the clamp 11 is shown in more detail in FIGS. 3 through 6. The various parts of control unit 50 are enclosed within a housing 55 which is rigidly attached to the clamping device. A plate 60 attached to a chain 61 supported by two sprockets 62, 63 forms a mechanical analogue of the clamping machine; in particular, the left-hand edge of the plate 60 corresponds, for purposes of control, to the position of the clamp element 11. The length of the plate 60 is slightly greater than the reduced scale distance corresponding to the total range of motion of the clamp 11. The allowable distance for the plate 60 to move to the right is also slightly greater than this distance. As shown more clearly in FIG. 5, the plate 60 moves in guideways 67 formed at the sides of the housing 55.

The chain 61 is driven by a reduction chain drive which includes a sprocket wheel 70 rigidly attached for rotation to the sprocket 62, a chain 71 connecting the sprocket wheel 70 with a smaller sprocket wheel 72 which is driven by a chain 75 (FIG. 2) which extends for the entire length of the machine and which is driven by attachment to the clamp 11. The chain drive, therefore, operates to drive the left edge of the plate 60 in a path which duplicates the motion of the clamp 11, but on a reduced scale. The particular drive ratios used in the present system are not particularly important and will depend entirely on the size and application of the system.

Referring again to FIG. 3, three switches 81, 82, 83 each have a wiper arm 84, 85, 86 which rides along the plate 60. The wiper arms are displaced very slightly in a longitudinal direction from one another. The center switch 82 is a single-pole, double-throw switch; the other two switches 81, 83 are single-pole, single-throw switches. The wiring of these switches will be described in greater detail below with respect to the schematic diagram of FIG. 7.

As more clearly shown in the sectional view (FIG. 6), each of the switches is rigidly attached to a plate 90 which is movable in guideways 91 in a longitudinal direction. The positioning element 51 which extends above the control unit and is used by the operator to set the desired position of the clamp is rigidly attached to the plate 90. The plate 90 is narrower than the width of the housing 55 at the slots 91 so that it may be moved slightly in a transverse direction in order to disengage the positioning element 51 from indexing slots 100 in a scale 101 attached to the upper portion of the housing (see FIG. 4). Thus, to move the switches 81, 82, 83, the operator moves the element 51 out of an indexing slot 100 and then in a longitudinal direction to the desired index setting. In the particular example illustrated, the settings run from 24 inches to 102 inches. Obviously, any particular set of index settings may be employed. While the index settings are particularly useful where dimensions are standardized, it should be noted that index settings need not be employed. When using index settings as shown, it is useful to employ a small microswitch 105 (FIG. 6) which prevents the motor from operating unless the position element 51 is secured to one of the index slots.

Referring now to the schematic diagram of FIG. 7, the motor 25 which drives the lead screw 16, is connected through a conventional motor-starter circuit 120 to a three-phase supply. The motor-starter circuit 120 is entirely conventional. It includes one common switch 130 and four directional switches 131, 132, 133, 134. The direction of the motor depends upon which two of the directional switches are closed. If the two forward switches 131, 132 are closed, the motor will move in one direction while if the two reverse switches 133, 134 are closed, the motor 25 will move in the reverse direction. The forward and reverse switches are controlled by two relays 140, 141. The first relay 140 operates the common switch 130 together with the two forward switches 131, 132 to drive the motor in a forward direction. The other relay 141 operates the common switch 130 together with the two reverse switches 133, 134 to move the motor in the opposite direction. A transformer 150 is connected across two of the three-phase supply lines and its secondary 151 supplies power for the two relays 140, 141. Thus, one side of the secondary 151 is connected, through the microswitch 105, to one side of both relays 140, 141. The other side of the secondary 151 is connected through the start button 52 mounted on the control unit and through the single-pole, double-throw switch 82 which rides along the plate 60 within the control unit 50. One of the poles 170 of the switch 82 is connected to the forward relay 140 while the other pole 171 is connected to the reverse relay 141.

The secondary 151 is also connected through a stop button 180, also mounted on the control unit, but used only in an emergency and through the other two switches 81, 83 to two series pairs of switches 190, 191, 192, 193 within the starter unit 120. The normal position of the switches is indicated in the drawing. The two series pairs of switches comprise a latching network for the forward and reverse relays 140, 141.

Operation

Having described the various elements of construction of the embodiment of the present invention illustrated, the operation will now be described. Initially, the operator decides upon the desired location of the clamp 11 and moves the positiong element 51 to the designated index slot. For example, if the operator wishes the clamp 11 to move to a position 60 inches from the stationary clamp 10, he moves the positioning element 51 to the index slot labeled 60. By moving the positioning element 51, the operator, of course, moves the three switches 81, 82, 83. Depending upon the particular location of the clamp element 11, the switches will be on or off the plate 60. With the plate 60 in the position shown in FIGS. 3 and 4, the switches 81, 82, 83 will obviously be on the plate.

Having moved the positioning element 51 to the desired setting, the operator presses the start button 52. Since the switches are on the plate 60, the electrical position of the switches will be that indicated in the schematic of FIG. 7. Thus, when the start button 52 is depressed, the forward relay 140 will be energized. When the relay 140 is energized, it closes the common switch 130 and the two forward switches 131, 132 connecting the motor 25 to the three-phase supply thereby starting the motor 25 moving in the forward direction. At the same time, the forward relay 140 operates the normally open forward latching switch 190 to close that switch, thus supplying current to the forward relay 140 even after the operator removes his finger from the start button. As the motor 25 turns the lead screw 16 so that the clamp 11 moves in a forward direction, the plate 60 will also move in a forward direction to the right. The plate 60 will continue its movement until the left edge of the plate 60 arrives at the switch wiper arms. As soon as the first wiper arm 84 falls off the edge of the plate 60, the switch 81 opens and current is no longer supplied to the forward relay 140. Thus, the forward switches 131, 132 in the motor circuit are opened and the motor 25 stops. It has been found that there may be dimensional error due to hysteresis and/or inertia of the electrical and mechanical components. To compensate for this, two of the three switches are displaced slightly from one another. The particular displacement of the wiper arms 84, 85, 86 obviously depends upon the particular details of the system. If hysteresis and/or inertia can be tolerated, then a single-pole, double-throw switch may be substituted for the two switches 81, 83.

The operation of the device is essentially the same when the plate 60 is to move in a reverse direction. The only difference here is that when the operator depresses the start button 152 the reverse relay is energized through the switches 82 and 83. Note that the switch 83 is open when on the plate 60 and closed when off the plate 60. Just the opposite is true of the switch 81.

While one embodiment of the invention has been described in detail, the invention is in no sense limited to that embodiment. It should be particularly noted that the invention is not limited to linear motion of the mechanical analogue; rotary motion is also suitable. Other modifications are also clearly within the scope of the invention which is defined by the following claims.
What is claimed is:

1. A position control system comprising
   (a) a controlled element whose position is to be controlled;
   (b) driving means for moving said element;
   (c) a mechanical analogue of said controlled element including a reference element and means for driving said reference element to duplicate the motion of the controlled element, said mechanical analogue, including the driving means and reference element, being remote from said controlled element;
   (d) power supply means for said driving means, switching means coupled between said power supply means and said driven means, said switching means including;
   (e) switching means for starting said driving means; and switching means operated by said reference element and having first and second states for (1) controlling the direction of said driving means, said direction being dependent upon the state of said switching means, and (2) for stopping said driving means when a change in state of said switching means occurs; and
   (f) means for varying the relative position of said reference element and the switching means operated by the reference element to set the desired position of said controlled element.

2. The position control system of claim 1 further including a pressure responsive device for moving said controlled element over a relatively limited range.

3. The position control system of claim 1 wherein said reference element duplicates the motion of said controlled element on a reduced scale and includes a plate having a length which is at least equal to the equivalent of the range of said controlled element on said reduced scale, said plate being capable of moving a distance equal to at least the equivalent of the range of said controlled element on said reduced scale.

4. The position control system of claim 3 wherein said switching means includes a plurality of switches movable in a direction generally parallel to the motion of said plate and actuated by the edge of said plate.

5. The position control system of claim 4 further including indexing means for said switching means whereby the operator of the position control system may set the position of said switching means at one of a finite number of index positions.

6. The position control system of claim 4 further including two relays and a plurality of switches actuated by said relays, said relay actuated switches controlling the supply current to said motor so that when a first of said relays is energized the switches operate so the motor is driven in a forward direction and when the second relay is energized the switches operate to drive said motor in a reverse direction, a power source for said relays and wherein said plurality of movable switches control the energization of said two relays by said power source.

7. The position control system of claim 6 wherein said switching means is arranged so that said edge of said plate stops at approximately a position relative to said switching means which is independent of the direction from which said position is approached.

8. The position control system of claim 6 further including a start switch coupled to said source of power and wherein said switching means includes a first control switch for associating said start switch with one of said two relays, said first control switch being actuated by the edge of said plate.

9. The position control system of claim 8 wherein said switching means further includes two control switches, and said relay actuated switches include a latching network for said relays, said two control switches controlling the current delivered to said latching network.

References Cited
UNITED STATES PATENTS

| | | | |
|---|---|---|---|
| 1,570,547 | 1/1926 | Avera | 318—266 X |
| 2,695,382 | 11/1954 | Wheatley et al. | 318—468 X |
| 2,755,423 | 7/1956 | Hager | 318—468 X |
| 3,369,087 | 2/1968 | Eller | 200—47 |

ROBERT K. SCHAEFER, Primary Examiner

T. B. JOIKE, Assistant Examiner

U.S. Cl. X.R.

318—266, 466